United States Patent [19]

Gerhardt

[11] Patent Number: 5,538,201
[45] Date of Patent: Jul. 23, 1996

[54] SUPERSONIC NATURAL LAMINAR FLOW WING

[75] Inventor: Heinz A. Gerhardt, Redondo Beach, Calif.

[73] Assignee: Northrop Grumman Corporation, Los Angeles, Calif.

[21] Appl. No.: 167,602

[22] Filed: Dec. 14, 1993

[51] Int. Cl.$^6$ ........................................... B64C 3/10
[52] U.S. Cl. .......................... 244/204; 244/36; 244/45 R
[58] Field of Search .................... 244/204, 34 R, 244/35 R, 35 A, 36, 45 R, 45 A, 214, 215, 213, 15, 13, 198, 199; D12/333

[56] References Cited

U.S. PATENT DOCUMENTS

| | | | |
|---|---|---|---|
| 1,731,666 | 10/1929 | Jackson | 244/215 |
| 1,843,678 | 2/1932 | Jannin | 244/36 |
| 2,470,348 | 7/1944 | Haight, Jr. | |
| 2,584,198 | 2/1952 | Griffith | |
| 2,657,745 | 11/1953 | Bleecker | 60/736 |
| 2,943,828 | 7/1960 | Van Driest | 244/117 A |
| 2,982,496 | 5/1961 | Creasey et al. | |
| 2,997,256 | 8/1961 | Walker | |
| 3,015,461 | 1/1962 | Fineblum | 244/135 R |
| 3,052,431 | 9/1962 | Compton | 60/736 |
| 3,090,212 | 5/1963 | Anderson et al. | 244/117 A |
| 3,097,817 | 7/1963 | Towzey, Jr. | |
| 3,108,768 | 10/1963 | Thomas | 244/45 R |
| 3,310,262 | 3/1967 | Robins et al. | 244/45 R |
| 4,171,785 | 10/1979 | Isenberg | 244/123 |
| 4,273,304 | 6/1981 | Frosch et al. | 244/117 A |
| 4,767,083 | 8/1988 | Koenig et al. | 244/12.3 |
| 4,807,831 | 2/1989 | Brewer et al. | 244/209 |
| 4,986,495 | 1/1992 | Stromath et al. | 244/117 |
| 5,112,120 | 5/1992 | Wood | 244/35 R |
| 5,114,097 | 5/1992 | Williams | 244/119 |
| 5,156,358 | 10/1992 | Gerhardt | 244/45 R |
| 5,322,242 | 6/1994 | Tracy | 244/45 R |

FOREIGN PATENT DOCUMENTS

| | | | |
|---|---|---|---|
| 3727608A1 | 3/1989 | Germany | |
| 520791 | 3/1959 | Italy | 244/35 R |
| 578978 | 7/1946 | United Kingdom | 244/45 R |

OTHER PUBLICATIONS

"High Speed Civil Transport Study Boeing Commercial Airplanes New Airplane Development," NASA CR–4233, Sep. 1989.

Malik, M., "Prediction and Control of Transition in Supersonic and Hpersonic Boundary Layers," AIAA Journal, Nov. 1989.

Vincenti, Walter G., et. al., "Investigation of Wing Characteristics at a Mach Number of 1.53.I–Triangular Wings of Aspect Ratio 2," NACA RM–A7110, Dec. 19, 1947.

Lekoudis, S., "The Stability of the Boundary Layer on a Swept Wing with Wall Cooling," AIAA Paper 79–1495 presented at the AIAA 12th Fluid and Plasma Dynamics Conference, Williamsburg, VA, Jul. 1979.

*Primary Examiner*—Galen L. Barefoot
*Attorney, Agent, or Firm*—Terry J. Anderson; Karl J. Hoch, Jr.

[57] ABSTRACT

A reverse delta aerodynamic wing has a basic reverse delta wing portion bounded by a leading edge and by a pair of trailing edges extending from respective ends of said leading edge toward a trailing apex point and respective span-wise wing extensions in a natural laminar boundary layer wing region extending chordwise from said leading edge by a fraction of the chordlength of said wing and extending span-wise from opposing sides of said wing. Laminar flow control in other regions of the wing employs fuel stored in the wing as a coolant.

39 Claims, 7 Drawing Sheets

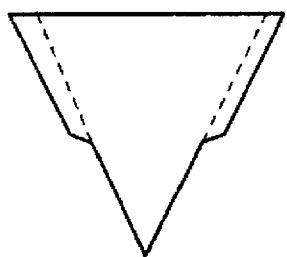
FIG. 2
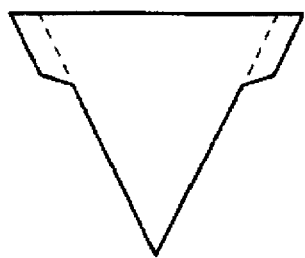 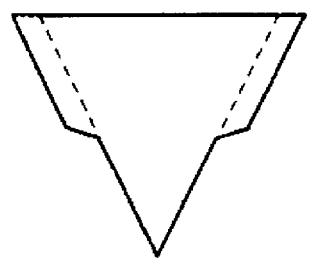 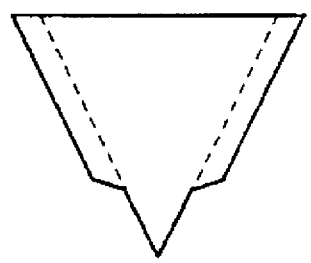
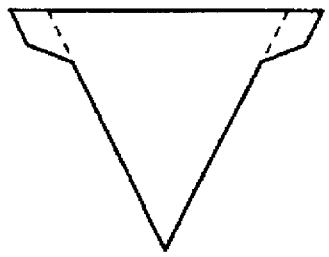 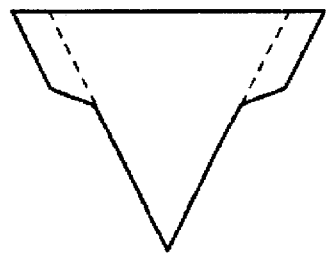 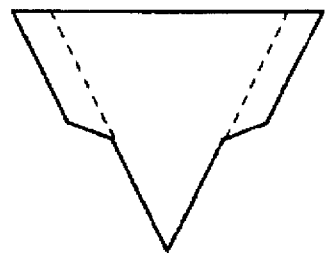
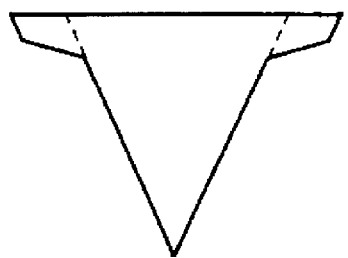 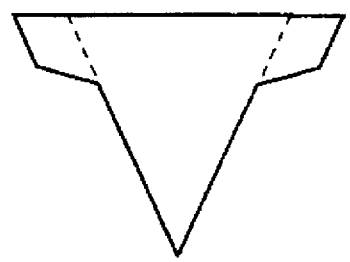 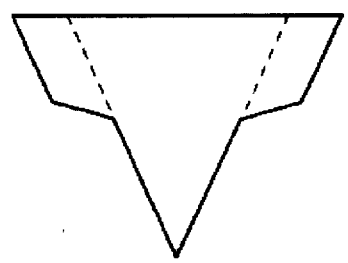

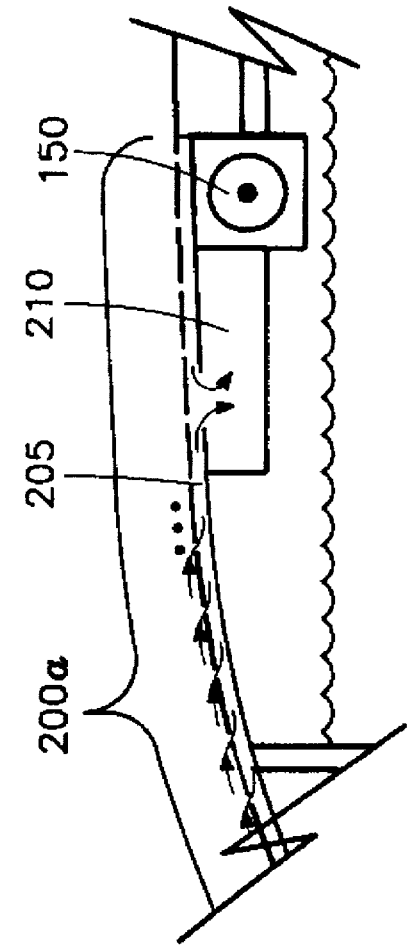
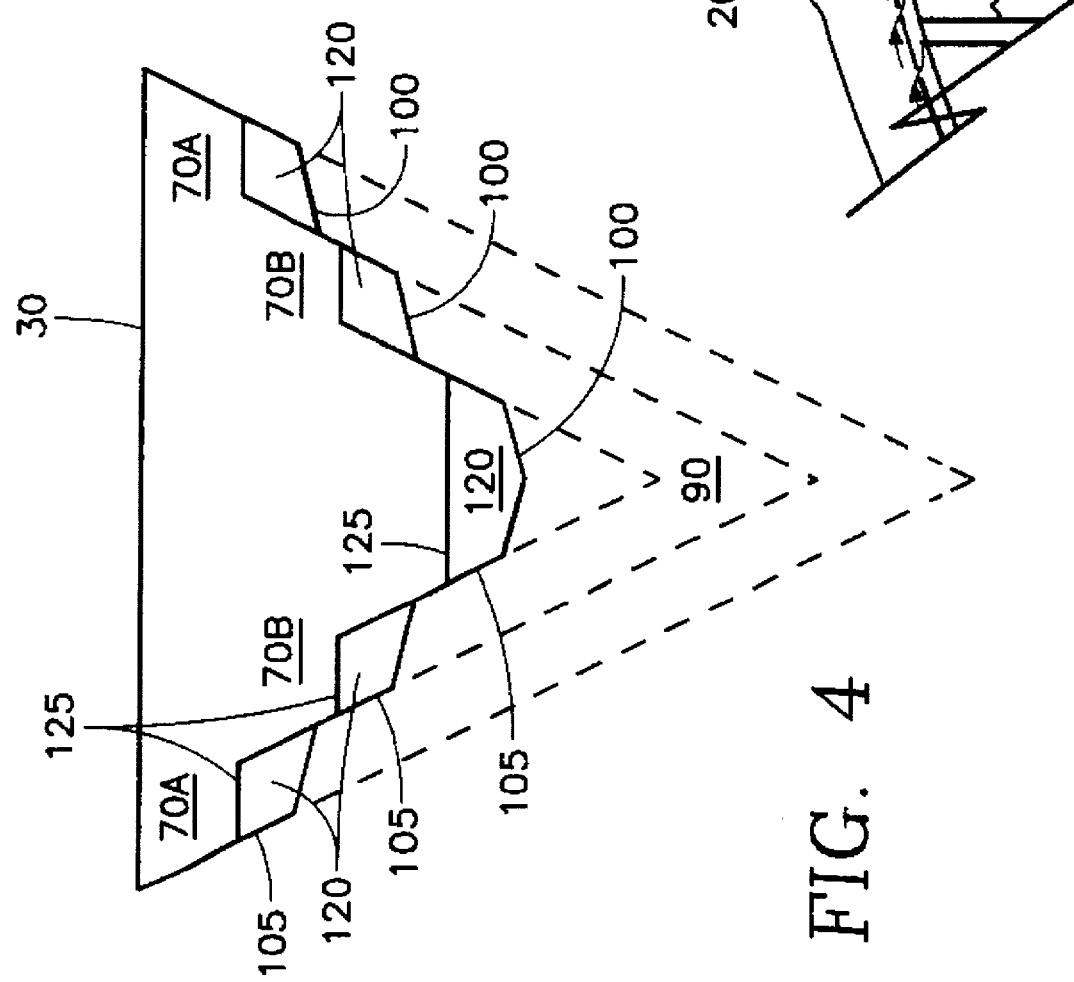
FIG. 4
FIG. 10

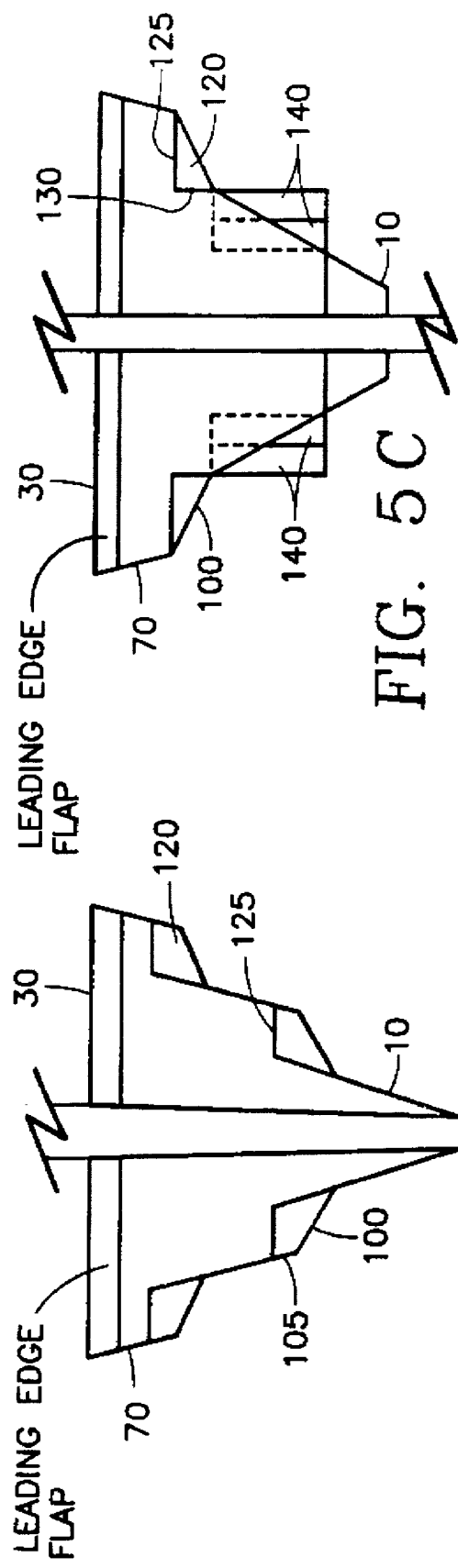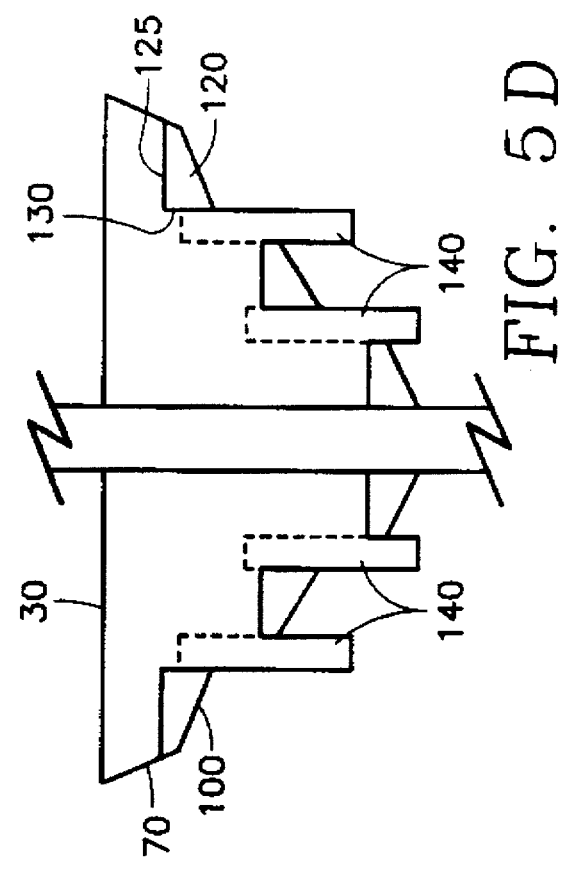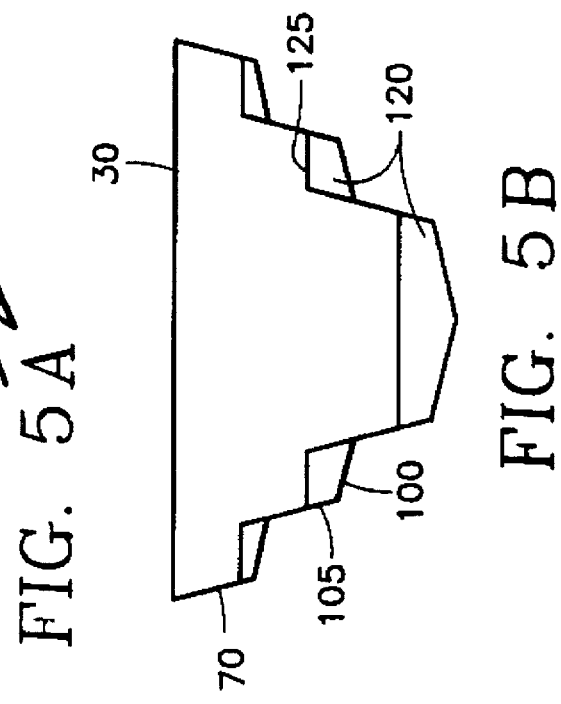

SUPERSONIC NATURAL LAMINAR FLOW WING

BACKGROUND OF THE INVENTION

1. Technical Field

The invention relates to reverse delta wings and modifications thereof and in particular to reverse delta wings for supersonic flight vehicles.

2. Background Art

Laminar Flow

The achievement of laminar boundary layers is a significant step in reducing aerodynamic drag and thereby increasing the cruise performance of commercial and military aircraft.

Reverse Flow Aerodynamics and the Reverse Delta Wing

A delta wing is normally thought to be moving through a fluid in the direction its apex is pointing. However, a delta wing flying in reverse direction, i.e., a reverse delta wing, has certain favorable aerodynamic characteristics which can be exploited for efficient supersonic flight. The reciprocal flow theorem for thin wings postulates that the wave drag (due to thickness) of a wing remains unchanged by a reversal of the direction of motion. (The wave drag equality for the two wings has been substantiated.) Another premise from the reciprocal flow theorem is that the lift curve slope remains unchanged by flow reversal. Furthermore, provided the leading and trailing edges are supersonic, the drag-due-to-lift at supersonic speeds is the same. Early investigations into the aerodynamics of reverse delta wings were carried out by NACA in 1947.

Delta wing flowfields differ in certain important aspects for supersonic airstreams approaching from opposite directions. At a sufficiently high freestream Mach number, the Mach cones from the tips of the reverse delta wing are swept along or downstream of the trailing edges. Thus, since the wing lies outside each tip's zone of influence, the flow over the wing is nominally two-dimensional. Surface pressure contours from Euler calculations on conventional and reverse delta wings clearly show that changes in pressure occur in a much more regular and linear fashion on the reverse delta wing. More importantly, strong pressure gradients occur near the leading edges of the delta wing where they cause unfavorable conditions for boundary layer stability. On the reverse delta wing, the strong pressure gradients are confined to the trailing edge regions where they do not interfere with boundary layer development. Spanwise pressure gradients which cause boundary layer crossflow are likewise concentrated near the leading edge of the delta wing and near the trailing edge of the reverse delta wing. Crossflow and attachment line instabilities, the primary modes of transition on swept wings, are thus absent on the reverse delta. Both wings have favorable chordwise pressure gradients over most of their surfaces.

Supersonic Laminar Flow

The absence of pressure gradients near the leading edge and the favorable gradients downstream provide the reverse delta wing with ideal conditions for achieving natural laminar flow (NLF). The question then arises as to how much natural laminar flow is achievable. Even under ideal conditions, a laminar boundary layer will transition to turbulent flow upon reaching a certain Reynolds number. There are indications that the transition Reynolds Number is much higher at supersonic speeds than at subsonic speeds. The unit Reynolds Number typical for high speed civil transport (HSCT) flight vehicles is Re/ft=1 million. NLF runs of the order of Re=10 to 30 million can be expected; in other words, laminar runs of 10 to 30% of the root chord may be achievable for a root chord length of about 100 feet. Given the favorable pressure gradient, it is conceivable that even larger laminar runs can be realized.

Because of the receding width of the reverse delta wing, a 10% chord-wise run covers 20% of the wing area, a 30% chord-wise run covers 50% of the wing area. The receding width offers another geometric benefit: turbulent boundary layer wedges which might originate at the wing tip apices cannot affect the wing surface as the wing width recedes along a larger angle than the turbulence lateral spread half angle.

Laminar Flow Control

Natural laminar flow is not expected in the rear portions of the wing. Laminar flow can be maintained there, however, by applying laminar flow control (LFC) techniques. Two techniques have been proposed for conventional delta wings: LFC-by-suction and LFC-by-cooling. In the former approach, the laminar boundary layer is stabilized by sucking a small amount of the boundary layer through tiny holes or small slits in the wing skin into the interior of the wing. There it is collected in small ducts, whence it is channeled into larger ducts and finally expelled rearward into the atmosphere. A suction compressor acts as the power source to move the suction air. LFC by suction is effective in overcoming chordwise-propagating Tollmien-Schlichting wave disturbances and the spanwise cross flow instabilities.

LFC-by-suction requires porous wing skins, ducts in wing and fuselage and suction compressors. Air ducts in the wing replace fuel which now has to be carried in the fuselage, ducts in the fuselage increase the airplane's cross-sectional area and thus its wave drag, and the suction compressors are large and heavy because they must operate in low density air at cruise altitude. And finally, energy is required to drive the compressors. Hence, weight, drag and energy penalties diminish the net advantage of LFC-by-suction considerably.

In LFC-by-cooling, the wing skin is cooled from inside the wing by a fluid. LFC-by-cooling is quite effective in suppressing the growth of the Tollmien-Schlichting disturbances, but only marginally effective in suppressing the crossflow instabilities characteristic of the conventional delta wing. The conventional delta wing and its derivatives with their strong spanwise pressure gradients can effectively benefit from LFC-by-suction only. Accordingly, LFC-by-cooling as applied to conventional delta wings has been generally abandoned by the art.

Drag Due to Lift Characteristics

As pointed out above, the zero-lift wave drag of delta and reverse delta wings are the same. Also, if both wings have supersonic leading edges (i.e. if the sweep angle of the leading edge is smaller than the Mach angle), then the drag due to the lift factor $K=C_{DL}/C_L^2$ is the same. However, delta wings can have subsonic leading edges (when the leading edge sweep angle is larger than the Mach angle) in which case leading edge thrust may be achievable which reduces drag due to lift on that wing. This benefit is not attainable by the reverse delta wing. The leading edge thrust benefit must be traded off against laminar flow benefits of the reverse delta wing.

In reality, a delta wing with subsonic leading edges is not a suitable planform for a high-speed civil transport (HSCT) configuration. Such a wing would have a very low aspect ratio, and hence its subsonic cruise performance (essential for flight over land) would be severely compromised. Therefore, HSCT wing planforms currently being considered have higher aspect ratios in which only a portion of the wing leading edge is subsonic. That diminishes their leading edge thrust advantage.

Trailing Edge Flaps

Deflected trailing edge flaps are primarily used to increase the lift of a wing at moderate angles of attack to ensure good takeoff and landing performance. Flaps along the unswept trailing edge of a conventional delta wing operate efficiently because their hingelines are basically normal to the flow. They also cause strong nose-down pitching moments because the lift increment produced by the flaps acts at a point far behind the center of gravity of the aircraft. This limits the usable deflection and the attendant lift increment substantially.

Trailing edge flaps with highly swept hingelines, such as would be the case on a reverse delta wing, could be rather ineffective, as flap effectiveness theoretically diminishes in proportion to the cosine-squared of the sweep angle. However, since these flaps cause less of a nose-down pitching moment, large deflections can be utilized to make up for the lower lift increment at a given deflection.

There is therefore a need to increase the amount of natural laminar flow experienced by a reverse delta wing. There is also need to induce greater laminar flow on a reverse delta wing using laminar flow control. There is a further need to provide trailing edge flaps on a reverse delta wing without impairment of flap effectiveness due to the highly swept hingeline inherent in the reverse delta wing.

SUMMARY OF THE DISCLOSURE

The invention is embodied in a reverse delta aerodynamic wing including a basic reverse delta wing portion bounded by a leading edge and by a pair of trailing edges extending from respective ends of the leading edge toward a trailing apex point and respective span-wise wing extensions near the leading edge and extending span-wise from respective opposing sides of the wing. The wing is characterized by a laminar flow-to-turbulent flow transition boundary extending generally spanwise across the wing and located at a fraction of a root chord of the wing from the leading edge. This boundary defines a region of laminar flow between the transition boundary and the leading edge. A major portion of the spanwise wing extensions are located within the region of laminar flow, so that the extensions increase the amount of natural laminar flow experienced by the wing beyond what has been considered possible.

In one embodiment, the trailing edges meet at a point which is closer to the leading edge than the apex point, whereby to minimize surface area of the wing outside of the region of laminar flow. A portion of the wing contiguous with the trailing edges includes plural trailing edge flaps, there being respective hinge lines at which respective ones of the flaps are rotatably connected to a remainder of the wing, the hinge lines extending generally span-wise relative to the wing. Each of the trailing edges includes plural steps, each of the steps including a span-wise trailing edge portion and a chord-wise edge. The wing includes respective flaps at respective ones of the steps.

In order to solve the problem of reduced flap effectiveness with increasing hingeline sweep angle, one feature of the present invention is a series of trailing edge flap planforms in which hingeline sweep is reduced relative to the trailing edge sweep angle.

It is a realization by the inventor herein that the reverse delta wing and its derivatives, given their lack of spanwise pressure gradients, are well-suited to benefit from LFC-by-cooling, unlike the conventional delta wing. One preferred feature of the present invention is to employ fuel as the LFC coolant in a reverse delta wing. With fuel as the heat sink available throughout much of the interior of the wing, the implementation poses no major technical obstacles. Additionally, the fuel may be pre-cooled on the ground before flight to increase its effectiveness as an LFC coolant.

The surfaces of an aircraft flying at supersonic speeds are subject to aerodynamic heating. Depending upon the specific flight Mach number, skin temperatures are reached at which standard aircraft structural materials such as aluminum alloys loose their strength. Therefore, high temperature materials such as titanium must be considered which, because of their lower specific strength, entail severe weight penalties. These materials also cost more and are more difficult to process in the manufacturing stage. Substantial economic benefits accrue if, by means of cooling the skin, the use of standard structural materials can be continued. Note that cooling of the skin (on a supersonic aircraft) for the purpose of material substitution is only feasible in conjunction with laminar flow. In case of turbulent flow, the heat transfer rates from air to skin are an order of magnitude higher, making the fuel heat sink capacity inadequate.

An additional benefit of LFC-by-cooling in a reverse delta wing is that the cooled wing surface is less likely to form surface waves from heat expansion. The absence of waves is a pre-condition for maintaining a laminar boundary layer obtained actively or passively.

There are synergistic benefits obtained from cooling the wing surface to achieve laminar flow. Not only is the friction drag reduced by an order of magnitude as compared to turbulent flow, the heat transfer from air to skin is reduced by an order of magnitude as well (as compared to heat transfer by turbulent boundary layers). This means that the heat sink capacity of the fuel required is comparatively small, a significant advantage. Thus, there is a three-way synergism: cooling achieves laminar flow—laminar flow makes cooling feasible laminar flow reduces drag.

BRIEF DESCRIPTION OF THE DRAWINGS

FIG. 2 includes diagrams of various reverse delta-wing configurations embodying the concept of FIG. 1.

FIG. 4 is a third embodiment combining the features of the embodiments of FIGS. 1 and 3.

FIGS. 5A, 5B, 5C and 5D illustrate some variations of the embodiment of FIG. 4.

FIG. 9 and FIG. 10 illustrate the application of laminar flow control by suction and laminar flow control by cooling in a conventional delta wing.

DETAILED DESCRIPTION OF THE PREFERRED EMBODIMENTS

Reverse Delta Wing Performance

Figure 1:
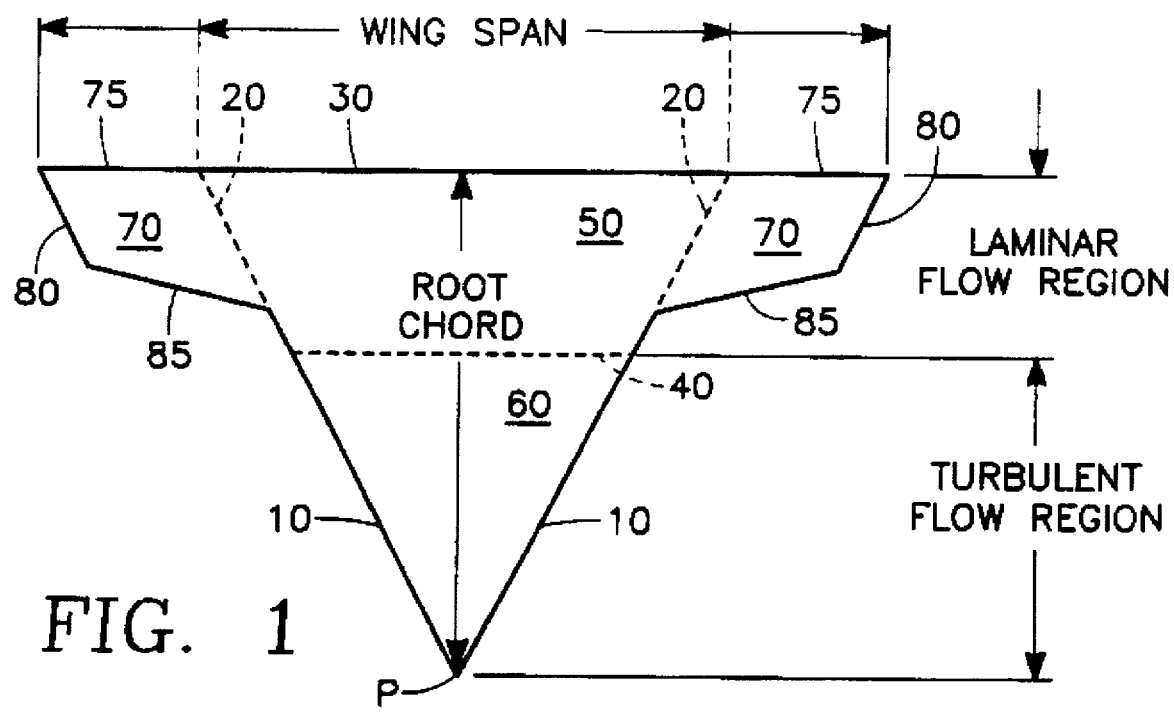
FIG. 1 is a plan view of an aerodynamic reverse delta wing including span-wise extensions in a laminar flow region of the wing in accordance with a first embodiment of the invention.

Referring to FIG. 1, a reverse delta wing has a simple triangular shape including trailing edges 10 converging at a trailing point P at the rear and continuing forward along the dashed lines 20 to a leading edge 30. At supersonic speeds, the boundary layer at the wing surface exhibits laminar flow starting at the leading edge 30 and continuing for some fraction of the root chord of the wing and terminating at an imaginary transition boundary line 40 shown in dashed line (which is not necessarily a straight line). Behind the transition boundary 40, air flow across the wing surface is turbulent. The region 50 of laminar flow contributes the lowest drag of any area of the wing. The region 60 of turbulent flow contributes the highest drag of any area of the wing and therefore represents a significant limitation on lift-to-drag characteristics.

Reverse Delta Wing with Span Extensions

In accordance with a preferred embodiment of the invention, the lift provided by the wing is enhanced without a proportionate increase in drag by increasing wing surface area primarily in regions of laminar flow. Specifically, the wing span is increased primarily in the laminar flow region above the imaginary transition boundary 40. As illustrated in FIG. 1, reverse delta wing span extensions 70 extend spanwise to the left and right, respectively, in the laminar flow region above the imaginary transition boundary 40. Thus, the wing span is extended to add wing area only in laminar flow regions so that proportionately more of the total wing experiences laminar flow and less experiences turbulent flow.

A span extension of the basic reverse delta wing is achieved by adding the small wing panels 70 whose leading edges 75 are extensions of the basic wing's leading edge 30, whose side edges 80 are preferably but not necessarily parallel to the trailing edges 10 of the basic delta wing and whose trailing edges 85 have a small to moderate sweep angle. A family of reverse delta wing planforms having such span extensions of varying span and area are illustrated in FIG. 2.

The ratio $S_{tot}/S_{ref}$ denotes the ratio of the total wing planform area to the area of the basic reverse delta wing. The ratio $b_{tot}/b_{ref}$ denotes the ratio of the total extended wing span to the span of the basic reverse delta wing.

It is clear that any number of additional wings can be obtained by interpolating between the planforms shown in FIG. 2 and by extrapolating wing planforms characterized by even higher values of $b_{tot}/b_{ref}$ and $S_{tot}/S_{ref}$. The wing planforms are shown with straight (unswept) leading edges. Planform variations featuring small positive or negative leading edge sweep angles (e.g., FIG. 6) are also feasible as these small deviations do not detract from the laminar flow advantages described above.

The purpose of the span extensions 70 is to increase the total wing span while minimizing the increase in total wing area. This increase in wing aspect ratio results in a decrease in drag-due-to-lift at subsonic speeds leading to improved takeoff and landing performance, better climb rates and increased subsonic cruise performance. The latter is essential for flight over land where supersonic flight is ruled out because of the sonic boom annoyance problem.

A significant feature is that the area added by the wing span extensions 70 is forward of the regions where natural laminar flow can be expected, thus increasing the percentage of the total wing area covered by laminar flow. Hence, on a wing of a given total area (producing a given amount of lift), the friction drag is further diminished over the (already low) friction drag of the basic reverse delta wing with natural laminar flow.

Reverse Delta Wing with Abbreviated Trailing Chord

Figure 3:
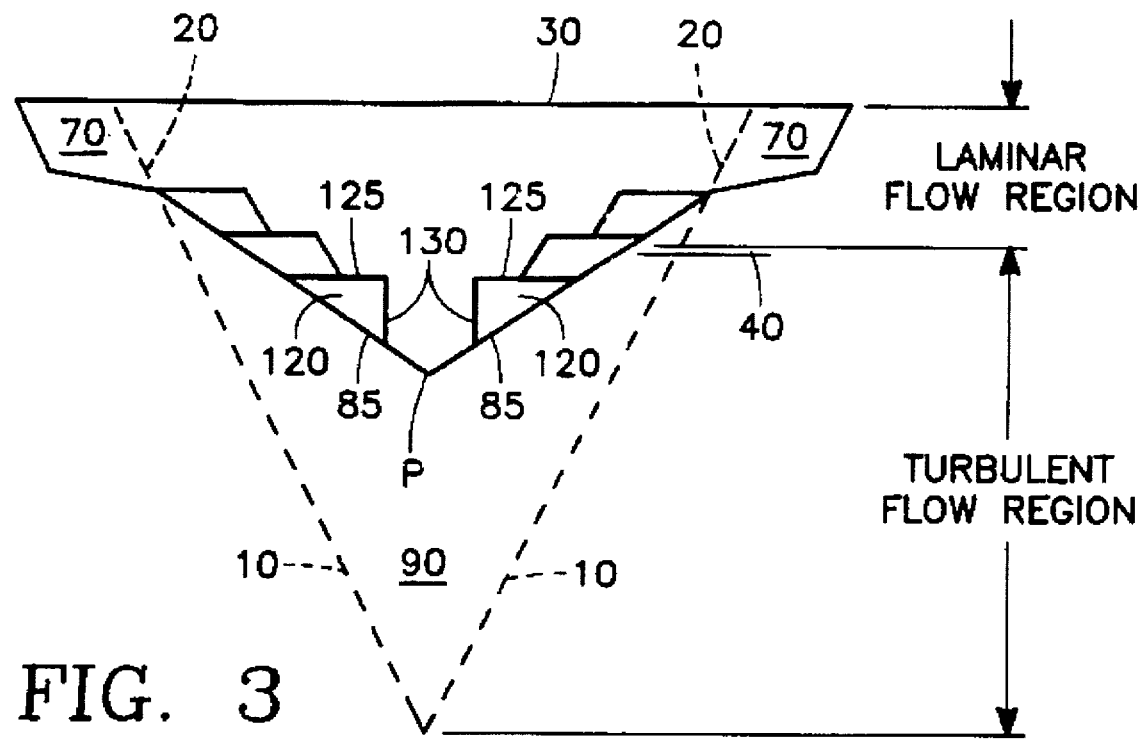
FIG. 3 is a plan view of an aerodynamic reverse delta wing in which a significant portion of the wing area in a non-laminar flow region of the wing has been eliminated in accordance with a second embodiment of the invention.

In accordance with an alternative embodiment of the invention, drag is decreased without a proportionate decrease in lift by deleting most or much of the wing area in the turbulent flow region behind the imaginary transition boundary 40. As illustrated in FIG. 3, the wing extends from the leading edge 30 to abbreviated trailing edges 12 converging at a point p just behind the transition boundary 40. This eliminates an area 90 of the conventional reverse delta wing consisting of most if not all of the turbulent flow region behind the transition boundary 40.

Combination Embodiment

The span-wise extensions of the embodiment of FIG. 1 and the chord-wise deletion in the embodiment of FIG. 3 of much of the wing area trailing the transition boundary 40 are combined in a single wing as illustrated in FIG. 4. In addition, FIG. 4 shows that the abbreviated trailing edges 12 may be partitioned into plural steps, each step consisting of trailing edge sections 100 and side edges 105. In the example of FIG. 4, there are three steps on each side of the wing, for a total of six steps. The area 70A, 70B above each trailing edge section 100 may be considered one span-wise wing extension, so that there are plural span-wise wing extensions in the combination embodiment of FIG. 4, at least some of which lie exclusively in laminar flow regions.

Trailing Edge Flaps

FIG. 3 illustrates how to reduce the trailing edge flap hinge line sweep angle in accordance with one embodiment of the invention. In this embodiment, the trailing region of the wing may be thought of as being divided into plural flaps 120 along the abbreviated trailing edge 12 separated from the remaining wing surface by span-wise hinge lines 125 and chord-wise gaps 130. Each flap 120 rotates about the hinge line 125. Each hinge line 125 extends at least nearly parallel to the span of the wing, providing the desired effectiveness discussed above.

Leading Edge Flaps

Leading edge flaps on the reverse delta wing have superior effectiveness relative to vortex flaps on a conventional delta. Working in conjunction with the trailing edge flaps, the leading edge flaps increase the maximum lift of the wing and improve static and dynamic stability. Leading edge flaps also produce subsonic performance benefits by capturing leading edge thrust on the sharp-edged airfoil. The resulting lift-to-drag improvement increases subsonic cruise performance and also increases climb rate or reduces engine thrust requirements during climb-out.

Some Examples of Variations

Many different variations on the embodiment of FIG. 4 are feasible, and four such variations are illustrated in FIGS. 5A–D. In the case of FIGS. 5C and 5D, placement of jet engines 140 is shown.

Exemplary Airplane

Figure 6:
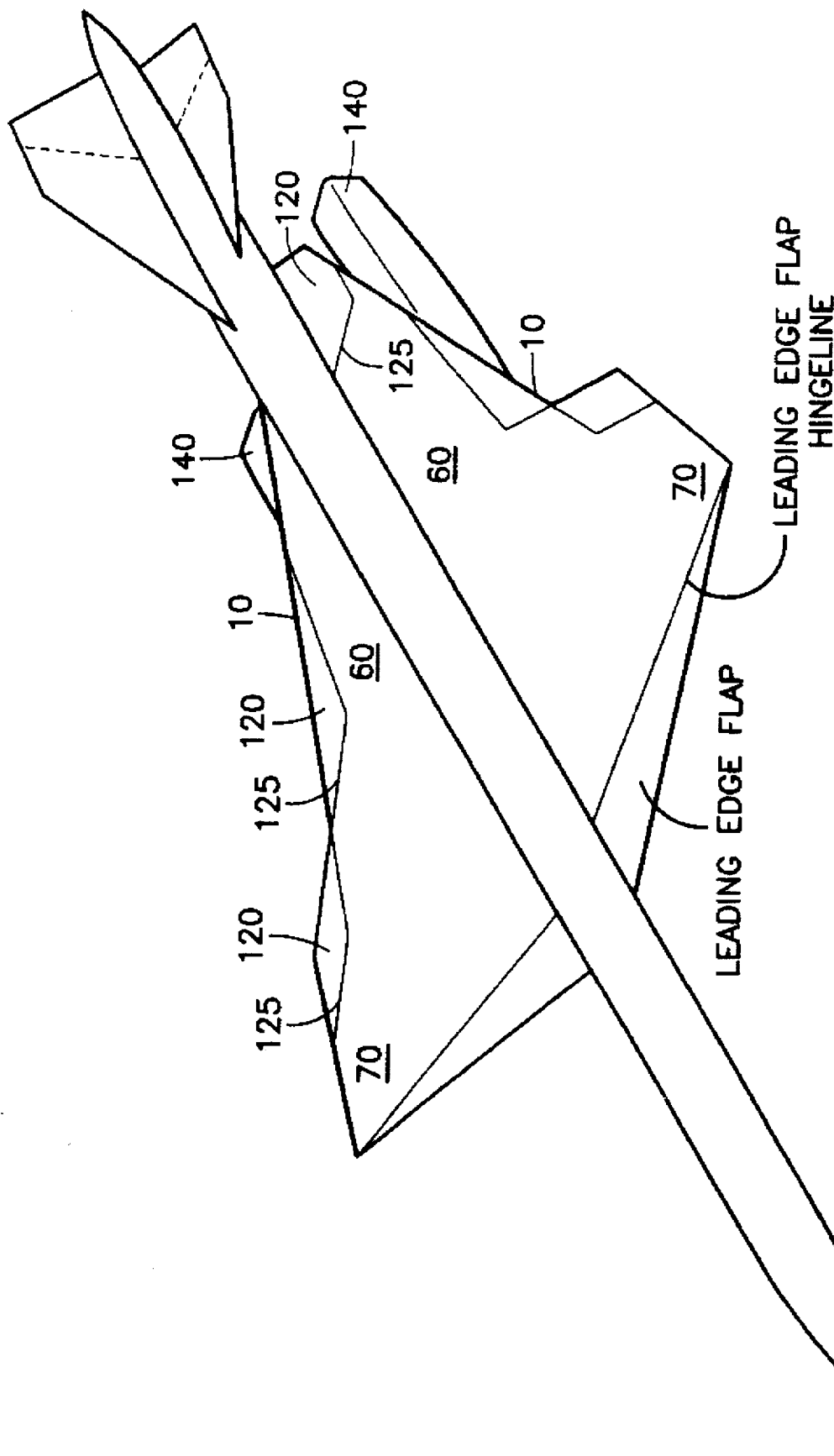
FIG. 6 is a simplified perspective view of a flight vehicle including a wing in accordance with the embodiment of FIG. 4.

FIG. 6 is a perspective view of an airplane corresponding to the embodiment of FIG. 1 illustrating the placement of the engines 140, the trailing flaps 120 and the leading edge flaps.

Laminar Flow Control by Cooling

Laminar flow control by cooling is used in the present invention to extend the chordwise reach of laminar flow beyond the limits of natural laminar flow and so cover virtually all of the wing surface with laminar flow. In addition to the drag reduction benefits arising from laminar flow, the cooling of the surfaces will allow the use of standard (low temperature limit) aluminum alloys as structural materials in the wing.

Figure 7:
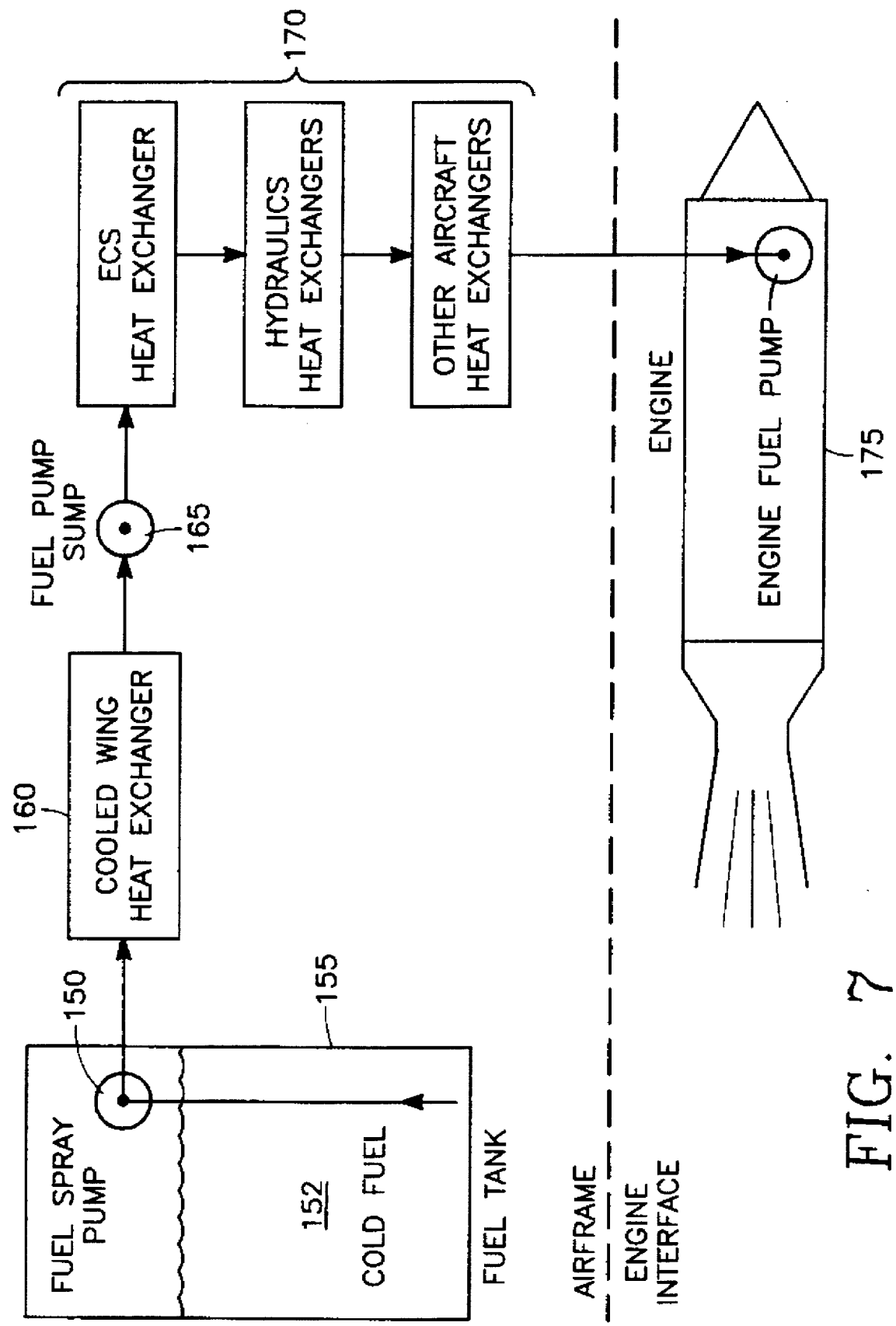
FIG. 7 illustrates a laminar flow control by cooling system in accordance with the present invention.
Figure 8:
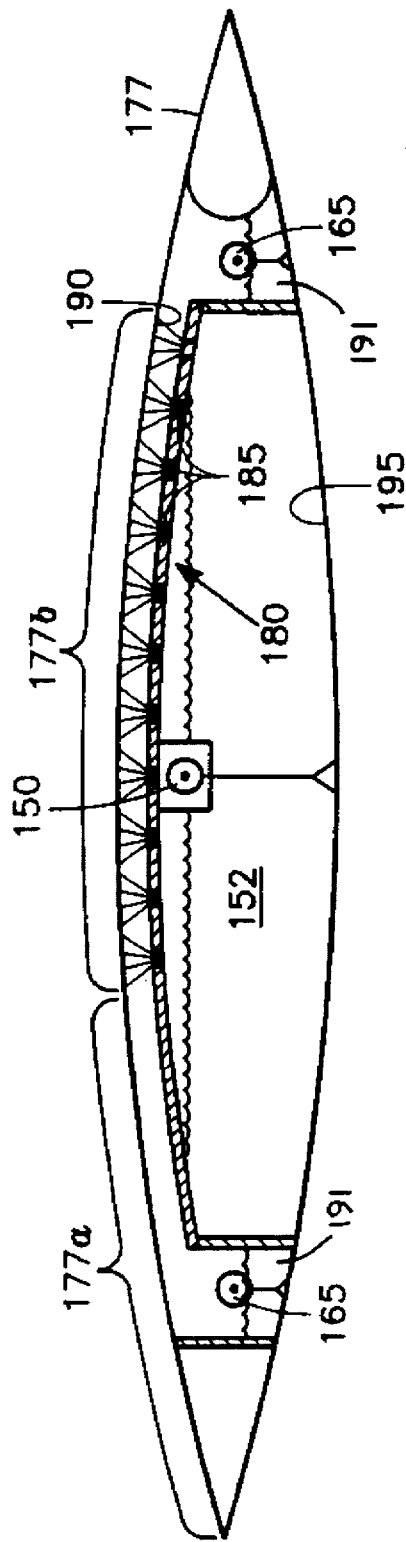
FIG. 8 illustrates the application of laminar flow by cooling to provide extended laminar flow over a reverse delta wing in accordance with the present invention.

The present invention includes laminar flow control by using fuel in the wings as the coolant. While gravity maintains the fuel in contact with the lower interior wings surfaces, a spray system distributes the fuel across the upper interior wing surfaces as the fuel level falls during flight. Referring to FIG. 7, a tank fuel pump 150 delivers cold fuel 152 from a fuel tank 155 to a wing cooling heat exchanger system 160. This can be either an internal spray system as shown in FIG. 8 or an internal surface-mounted array of coolant tubes (not illustrated). After cooling the wing skin, the warm fuel is moved by a sump pump 165 through the airframe heat exchangers 170 (including, for example, an environmental control system, a hydraulic control system and other heat exchangers). After cooling the heat exchangers 170, the now hot fuel is delivered to the engine 175 where it is burned to provide propulsive thrust.

FIG. 8 shows the application of wall-cooling to provide extended laminar flow over a reverse delta wing 177. The front portion 177a of the wing 177 will have natural laminar flow (NLF) due to high transition Reynolds numbers associated with the supersonic, low freestream turbulence of the flight environment. Due to NLF on the front wing portion 177a, only the remaining portion 177b aft of the NLF portion 177a needs wall-cooling to maintain a laminar boundary layer. However, one may want cooling to start near the wing leading edge in order to maximize the wing area where low temperature materials can be used. As FIG. 8 illustrates, the wall-cooling on the upper interior wing surface is provided by a distributed spray system 180 including a set of fuel spray nozzles facing the upper interior wing surface 190. After cooling the upper interior wing surfaces 190, the warm fuel is collected in sumps 191 and pumped by the sump pump 165 to the airframe and engines to cool various subsystem heat exchangers 170 and provide propulsive thrust. The cooling of the lower wing surface 195 can be much simpler, relying on the direct contact of the cold fuel 152 with the lower interior wing surface.

Figure 9:
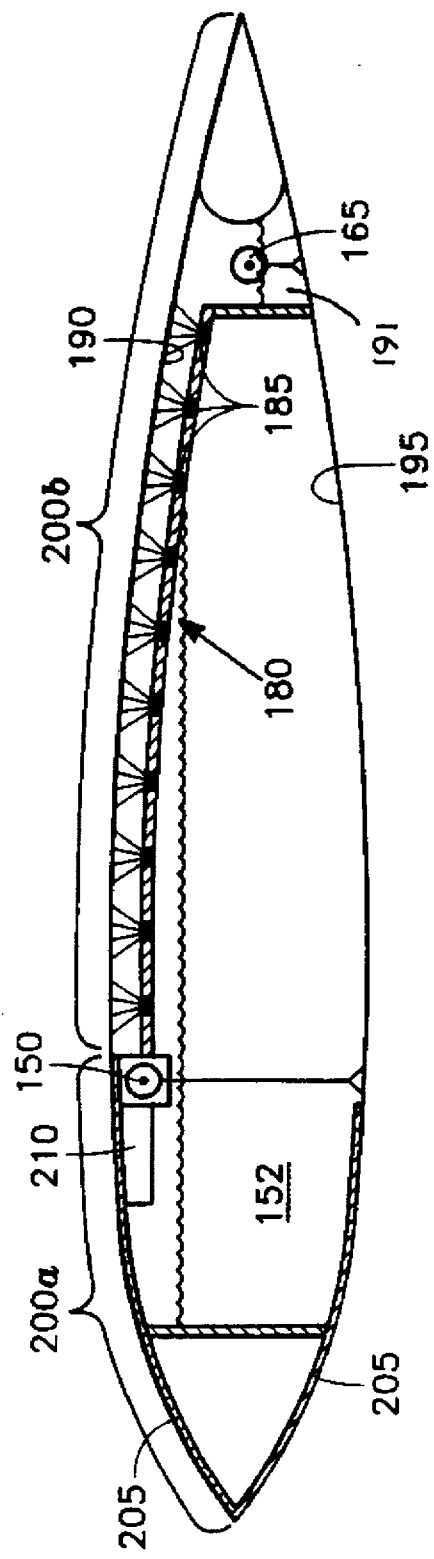

FIG. 9 and FIG. 10 illustrate the application of both suction LFC and cooling LFC to the interior region of a conventional delta wing 200 to provide extensive laminar flow across the wing. The wing 200 requires suction LFC to maintain laminar flow across the front wing portion 200a near the leading edge due to the strong crossflow in that region. Such suction LFC requires a conventional slot/hole system 205 in the wing skin and a compressor to withdraw air from the wing exterior along periodically spaced slots 205. Aft of the front portion 200a, it should suffice in many cases to use only wall-cooling LFC of the type illustrated in FIG. 8 to maintain laminar flow over the remaining wing portion 200b of the inboard delta wing planform where crossflow is minimal. This would reduce the size and weight penalties of the suction LFC system. The fuel flow for the wall cooling system of FIG. 9 is the same as that illustrated in FIG. 7.

While the invention has been described in detail by specific reference to preferred embodiments, variations and modifications thereof may be made without departing from the true spirit and scope of the invention.

What is claimed is:

1. A reverse delta aerodynamic wing, comprising:
   a basic reverse delta wing portion bounded by a leading edge and by a pair of trailing edges extending inwardly from respective ends of said leading edge toward a trailing apex point and meeting at a point; and
   respective span-wise wing extensions extending chordwise from said leading edge by a fraction of the chordlength of said wing and extending span-wise from opposing sides of said reverse delta wing portion;
   wherein a forward portion of said wing experiences two-dimensional flow consistent with achieving natural laminar boundary layer flow during flight at supersonic speeds.

2. The wing of claim 1 wherein a spanwise forward portion of said wing experiences natural laminar boundary layer flow during flight and a spanwise aft portion of said wing does not generally experience natural laminar boundary layer flow during flight, and wherein a major portion of said span-wise wing extensions are located within said spanwise forward portion of laminar boundary layer flow.

3. The wing of claim 2 wherein said spanwise forward portion of said wing experiencing natural laminar boundary layer flow extends back from said leading edge by fraction of a root chord of said wing, said fraction being generally in a range between approximately one-fourth and one-half.

4. The wing of claim 1 wherein aft portions of said trailing edges meet at said point, said point being closer to said leading edge than said apex point, whereby surface area of said wing outside of said spanwise forward portion of said wing experiencing natural laminar boundary layer flow is minimized.

5. The wing of claim 1 wherein a portion of said wing contiguous with said trailing edges comprises plural trailing edge flaps, and further comprising:
   respective hinge lines at which respective ones of said flaps are rotatably connected to a remainder of said wing, said hinge lines extending generally span-wise relative to said wing.

6. The wing of claim 1 wherein each of said trailing edges comprises plural steps, each of said steps comprising a span-wise trailing edge and a chord-wise side edge.

7. The wing of claim 6 further comprising respective flaps comprising respective ones of said steps.

8. The wing of claim 7 further comprising respective hinge lines at which respective flaps are rotatably mounted on the remaining portion of said wing.

9. The wing of claim 2 further comprising laminar flow control means for artificially inducing laminar flow in said aft region of said wing.

10. The wing of claim 9 wherein at least an aircraft engine propels said wing, said wing comprising a fuel container for storing fuel for said engine, said wing having a wing skin with an aerodynamic shape, said wing skin having an interior skin surface, and wherein said laminar flow control means is a means for cooling said aft region of said wing.

11. The wing of claim 10 wherein said means for cooling said aft region of said wing comprises:

nozzle means for applying said fuel stored inside said fuel container onto a selected portion of said interior skin surface;

sump means for collecting said fuel from said interior skin surface; and sump pump means for drawing said fuel from said sump means for eventual consumption by said engine.

12. The wing claim 11 wherein all fuel applied to said interior skin surface is collected by said sump means so as to prevent fuel heated by contact with the interior skin surface from returning to said fuel container, whereby to avoid heating fuel in said fuel container.

13. The wing of claim 12 wherein said nozzle means comprises plural fuel spray nozzles inside said wing facing an upper portion of said interior skin surface, said system further comprising a pump coupled between said fuel container and said fuel spray nozzles.

14. The wing of claim 13 wherein said upper portion of said interior skin surface underlies said aft portion of said wing skin.

15. The wing of claim 1 wherein said point is said trailing apex point.

16. The wing of claim 1 wherein said leading edge has a positive sweep angle.

17. The wing of claim 1 wherein said leading edge has a negative sweep angle.

18. The wing of claim 1, further comprising a leading edge flap extending spanwise along said leading edge of said wing.

19. A reverse delta aerodynamic wing, comprising:

a major reverse delta wing portion bounded by a leading edge and by a pair of trailing edges, said trailing edges comprising:

(a) forward trailing edge portions extending inwardly from respective ends of said leading edge toward a trailing apex point, and (b) aft trailing edge portions extending inwardly from aft ends of respective forward trailing edge portions and meeting at a point which is closer to said leading edge than said apex point; and respective span-wise wing extensions extending chord-wise from said leading edge along lengths of respective forward trailing edge portions and extending span-wise from opposing sides of said reverse delta wing portion;

wherein a forward portion of said wing experiences two-dimensional flow consistent with achieving natural laminar boundary layer flow during flight at supersonic speeds.

20. The wing of claim 19 wherein said aft trailing edge portions coincide with an aft region of said wing which is generally not subject to natural laminar boundary layer flow.

21. The wing of claim 20 wherein said forward trailing edge portions extend chordwise back from said leading edge by a fraction of a root chord of said wing, said fraction being generally in a range between approximately one-fourth and one-half.

22. The wing of claim 20 further comprising laminar flow control means for artificially inducing laminar flow in said aft region of said wing.

23. The wing of claim 22 wherein at least an aircraft engine propels said wing, said wing comprising a fuel container for storing fuel for said engine, said wing having a wing skin with an aerodynamic shape, said wing skin having an interior skin surface, and wherein said laminar flow control means is a means for cooling said aft region of said wing.

24. The wing of claim 23 wherein said means for cooling said aft region of said wing comprises:

nozzle means for applying the fuel stored inside said fuel container onto a selected portion of said interior skin surface;

sump means for collecting fuel from said interior skin surface; and sump pump means for drawing fuel from said sump means for eventual consumption by said engine.

25. The wing claim 24 wherein fuel applied to said interior skin surface is collected by said sump means so as to prevent fuel heated by contact with the interior skin surface from returning to said fuel container in the wing, whereby to avoid heating fuel in said fuel container.

26. The wing of claim 25 wherein said nozzle means comprises plural fuel spray nozzles inside said wing facing an upper portion of said interior skin surface, said system further comprising a pump coupled between said container and said fuel spray nozzles.

27. The wing of claim 26 wherein said portion of said interior skin surface coincides with said aft portions of said trailing edges.

28. The wing of claim 19 wherein a portion of said wing contiguous with said trailing edges comprises plural trailing edge flaps, and further comprising:

respective hinge lines at which respective ones of said flaps are rotatably connected to a remainder of said wing, said hinge lines extending generally span-wise relative to said wing.

29. The wing of claim 19 wherein each of said trailing edges comprises plural steps, each of said steps comprising a span-wise trailing edge and a chord-wise side edge.

30. The wing of claim 29 further comprising respective flaps comprising respective ones of said steps.

31. The wing of claim 30 further comprising respective hinge lines at which respective flaps are rotatably mounted on the remaining portion of said wing.

32. The wing of claim 19 wherein said leading edge has a positive sweep angle.

33. The wing of claim 19 wherein said leading edge has a negative sweep angle.

34. The wing of claim 19, further comprising a leading edge flap extending spanwise along said leading edge of said wing.

35. In a reverse delta wing on an aircraft having at least an aircraft engine for which fuel is stored inside a fuel container of the wing for consumption by said engine, said wing having a wing skin with an aerodynamic shape, wherein said wing experiences two-dimensional flow consistent with achieving natural laminar boundary layer flow during flight at supersonic speeds, said wing skin having an interior skin surface, and a laminar flow control system comprising means for cooling aft portions of said wing skin.

36. The laminar flow control system of claim 35 wherein said means for cooling said aft portions of said wing skin comprises:

nozzle means for applying the fuel stored inside said fuel container onto a selected portion of said interior skin surface;

sump means for collecting said fuel from said interior skin surface; and sump pump means for drawing said fuel from said sump means for eventual consumption by said engine.

37. The system of claim 36 wherein all fuel applied to said interior skin surface is collected by said sump means so as to prevent fuel heated by contact with the interior skin surface from returning to said fuel container in the wing, whereby to avoid heating fuel in said container.

38. The system of claim 37 wherein said nozzle means comprises plural fuel spray nozzles inside said wing facing an upper portion of said interior skin surface, said system further comprising a pump coupled between said container and said fuel spray nozzles.

39. The system of claim 38 wherein said portion of said interior skin surface underlies a portion of said wing skin not subject to natural laminar boundary layer flow.

* * * * *